US010442432B2

(12) United States Patent
Makled et al.

(10) Patent No.: US 10,442,432 B2
(45) Date of Patent: Oct. 15, 2019

(54) LEAD VEHICLE MONITORING FOR ADAPTIVE CRUISE CONTROL

(71) Applicant: Ford Global Technologies, LLC, Dearborn, MI (US)

(72) Inventors: Daniel A. Makled, Dearborn, MI (US); Michael McQuillen, Warren, MI (US); Jeremy Ferack, Livonia, MI (US); Ali Ahmad Ayoub, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 15/813,033

(22) Filed: Nov. 14, 2017

(65) Prior Publication Data
US 2019/0143971 A1 May 16, 2019

(51) Int. Cl.
B60W 30/16 (2012.01)
B60W 10/16 (2012.01)
B60W 10/08 (2006.01)
B60W 10/18 (2012.01)
B60W 10/20 (2006.01)
(Continued)

(52) U.S. Cl.
CPC ............ *B60W 30/16* (2013.01); *B60W 10/06* (2013.01); *B60W 10/08* (2013.01); *B60W 10/18* (2013.01); *B60W 10/20* (2013.01); *B60W 10/26* (2013.01); *B60W 2420/42* (2013.01); *B60W 2420/52* (2013.01); *B60W 2420/54* (2013.01); *B60W 2510/244* (2013.01); *B60W 2520/105* (2013.01); *B60W 2550/302* (2013.01); *B60W 2550/306* (2013.01); *B60W 2550/308* (2013.01); *B60W 2550/408* (2013.01); *B60W 2710/18* (2013.01); *B60W 2710/20* (2013.01); *B60W 2750/302* (2013.01); *B60W 2750/306* (2013.01);
(Continued)

(58) Field of Classification Search
CPC ...... B60W 30/16; B60W 10/16; B60W 10/08; B60W 10/18; B60W 10/20; B60W 10/26
USPC .......................................................... 701/96
See application file for complete search history.

(56) References Cited

U.S. PATENT DOCUMENTS 9,269,264 B2 * 2/2016 Shimizu ................. G08G 1/161
9,669,833 B2 6/2017 Abdel-Rahman et al.
(Continued)

FOREIGN PATENT DOCUMENTS

CN 105303830 A 2/2016
CN 106803008 A 6/2017

OTHER PUBLICATIONS

Meng Lu et al. *Classification of Longitudinal Driving Behaviour Based on Simulator Study*, 11 pages.
(Continued)

*Primary Examiner* — Yazan A Soofi
(74) *Attorney, Agent, or Firm* — Frank Lollo; Eversheds Sutherland (US) LLP

(57) ABSTRACT

Method and apparatus are disclosed for lead vehicle monitoring for adaptive cruise control. An example vehicle includes a communication module for V2V communication, a camera, a sensor, and an adaptive cruise control unit. The adaptive cruise control unit is to determine an acceleration oscillation value of a lead vehicle based upon measurements collected via at least one of the camera and the sensor and send, via the communication module, an instruction to the
(Continued)

lead vehicle to activate cruise control responsive to determining the acceleration oscillation value exceeds a threshold.

20 Claims, 4 Drawing Sheets

(51) Int. Cl.
*B60W 10/26* (2006.01)
*B60W 10/06* (2006.01)

(52) U.S. Cl.
CPC ... *B60W 2750/308* (2013.01); *B60W 2750/40* (2013.01); *Y10S 903/93* (2013.01)

(56) References Cited

U.S. PATENT DOCUMENTS

| | | | |
|---|---|---|---|
| 9,682,653 B2* | 6/2017 | Oh | B60R 1/00 |
| 2014/0121928 A1* | 5/2014 | Kurumisawa | B60T 8/1755 |
| | | | 701/70 |
| 2015/0344034 A1* | 12/2015 | Niino | B60W 30/16 |
| | | | 701/96 |

OTHER PUBLICATIONS

Arne Kesting et al. *General Lane-Changing Model MOBIL for Car-Following Models*, 9 pages.

* cited by examiner

LEAD VEHICLE MONITORING FOR ADAPTIVE CRUISE CONTROL

TECHNICAL FIELD

The present disclosure generally relates to adaptive cruise control and, more specifically, to lead vehicle monitoring for adaptive cruise control.

BACKGROUND

Oftentimes, vehicles include a cruise control devices, systems, and/or software that performs autonomous and/or semi-autonomous vehicle motive functions. Typically, a cruise control system enables an operator of a vehicle (e.g., a driver) to set a target speed of travel for the vehicle. Upon receiving the setting from the vehicle operator, the cruise control system autonomously controls the speed at which the vehicle travels to be the target speed. Recently, some vehicles include adaptive cruise control devices, systems, and/or software that autonomously decelerate a vehicle from the target speed upon detecting that the vehicle is approaching an object (e.g., a slower moving vehicle).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for lead vehicle monitoring for adaptive cruise control. An example disclosed vehicle includes a communication module for V2V communication, a camera, a sensor, and an adaptive cruise control unit. The adaptive cruise control unit is to determine an acceleration oscillation value of a lead vehicle based upon measurements collected via at least one of the camera and the sensor and send, via the communication module, an instruction to the lead vehicle to activate cruise control responsive to determining the acceleration oscillation value exceeds a threshold.

In some examples, the acceleration oscillation value corresponds to an amount of acceleration and deceleration performed by the lead vehicle over a predetermined period of time.

In some examples, the measurements are acceleration measurements of the lead vehicle. In some such examples, the threshold is a threshold number of occurrences that the lead vehicle accelerates or decelerates beyond a acceleration threshold range. In some such examples, the camera collects images of the lead vehicle to enable the adaptive cruise control unit to collect the acceleration measurements. In some such examples, the sensor includes a proximity sensor that detects location data of the lead vehicle to enable the adaptive cruise control unit to collect the acceleration measurements. In some such examples, the adaptive cruise control unit further collects the acceleration measurements via V2V communication with the lead vehicle.

In some examples, the measurements are energy consumption measurements that are collected while trailing the lead vehicle. In some such examples, the threshold is an energy consumption threshold range that corresponds to a constant rate of travel. In some such examples, the sensor is selected from the group consisting of a fuel level sensor that monitors a fuel tank and a BSM sensor that monitors a current of a battery.

In some examples, the adaptive cruise control unit is to collect second acceleration measurements of an adjacent vehicle in an adjacent lane of travel, determine a second acceleration oscillation value based on the second acceleration measurements, and compare the second acceleration oscillation value to a second threshold. In some such examples, the adaptive cruise control unit emits an alert responsive to the adaptive cruise control unit determining the second acceleration oscillation value is less than the second threshold. In some such examples, the adaptive cruise control unit sends a signal to autonomously change lanes into the adjacent lane responsive to determining the second acceleration oscillation value is less than the second threshold. In some such examples, the second threshold is different than the threshold.

In some examples, the adaptive cruise control unit smoothes, based upon the acceleration oscillation value, a trailing algorithm utilized for trailing the lead vehicle while adaptive cruise control is activated.

An example disclosed method includes performing, via a processor, adaptive cruise control for a vehicle and collecting measurements via at least one of a camera and a sensor of the vehicle. The example disclosed method also includes determining, via the processor, an acceleration oscillation value of a lead vehicle based on the measurements and sending, via V2V communication, an instruction to the lead vehicle to activate cruise control responsive to determining the acceleration oscillation value exceeds a threshold.

In some examples, the acceleration oscillation value corresponds to an amount of acceleration and deceleration preformed by the lead vehicle over a predetermined period of time.

Some examples further include determining a second acceleration oscillation value of an adjacent vehicle in an adjacent lane of travel and emitting an alert via at least one of a display and a speaker of the vehicle to alert a driver to the adjacent lane responsive to determining the second acceleration oscillation value is less than the threshold.

Some examples further include determining a second acceleration oscillation value of an adjacent vehicle in an adjacent lane of travel and autonomously changing lanes, via the processor, into the adjacent lane responsive to determining the second acceleration oscillation value is less than the threshold.

Some examples further include smoothing, based upon the acceleration oscillation value, a trailing algorithm utilized for trailing the lead vehicle while adaptive cruise control is activated.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
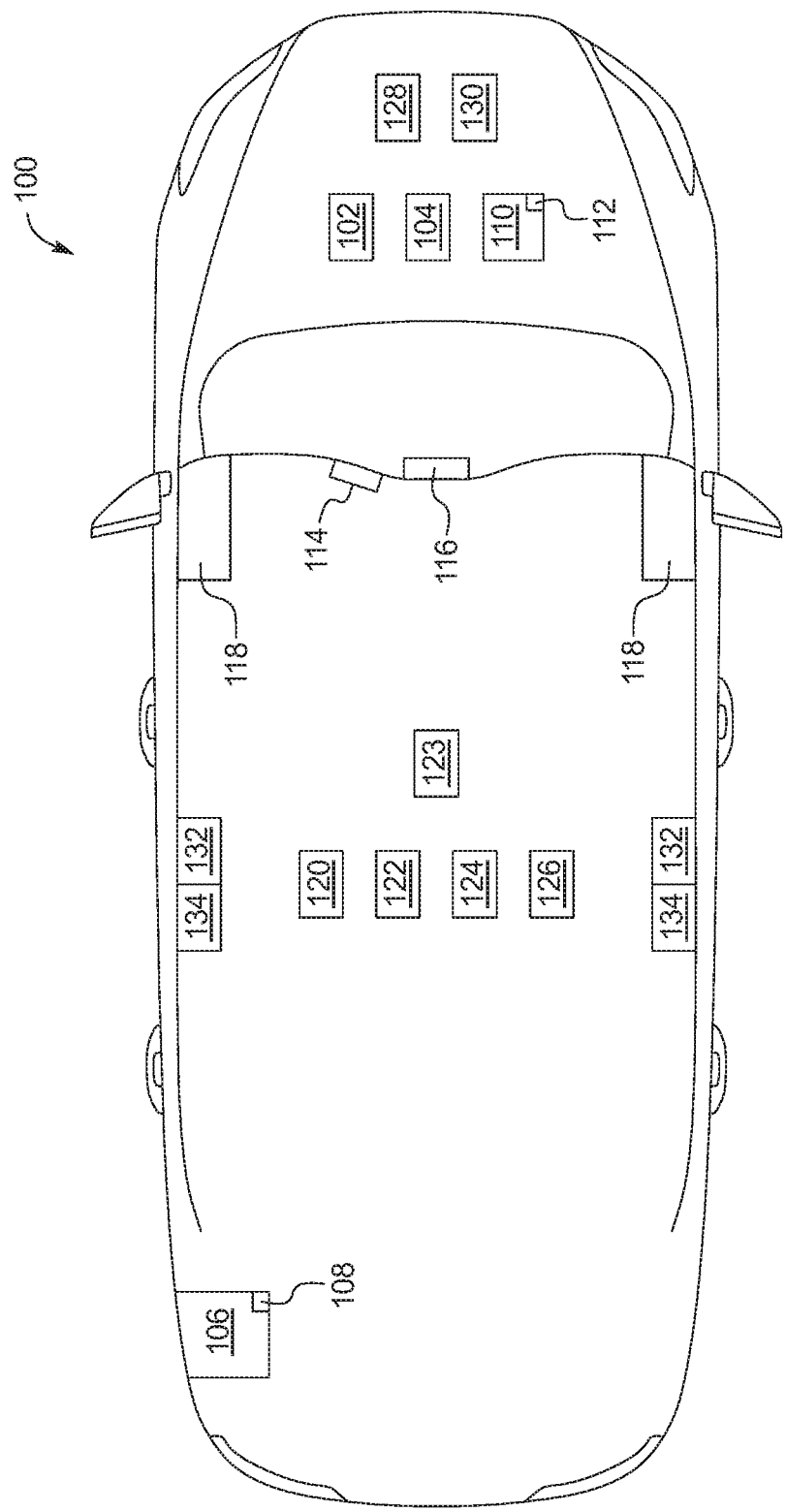
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include cruise control in which a vehicle autonomously controls a speed at which the vehicle travels. Typically, a cruise control system enables an operator of a vehicle (e.g., a driver) to set a target speed of travel for the vehicle. Upon receiving the setting from the vehicle operator, the vehicle autonomously controls the speed at which the vehicle travels to be the target speed. As used herein, "cruise control" refers to a system and/or a vehicle setting that enables a vehicle to autonomously and/or semi-autonomously travel at a target speed set by an operator of the vehicle.

Recently, some vehicles include adaptive cruise control in which a vehicle autonomously decelerates from a target speed upon detecting that the vehicle is approaching an object. As used herein, "adaptive cruise control" refers to a system and/or a vehicle that enables a vehicle to autonomously and/or semi-autonomously travel at a target speed set by an operator of the vehicle, accelerate to the target speed, and decelerate upon detecting that the vehicle is approaching another object (e.g., a slower moving vehicle). In some instances during which adaptive cruise control is activated, the vehicle approaches a vehicle that repeatedly oscillates between accelerating and decelerating in such a manner that potentially reduces a fuel efficiency of the vehicle trailing the lead vehicle and/or is potentially found to be annoying for a driver operating the vehicle trailing the lead vehicle.

Example methods and apparatus disclosed herein include an adaptive cruise control unit of a vehicle that monitors whether a lead vehicle that the vehicle is trailing is oscillating between accelerating and decelerating over a period of time that exceeds a predetermined threshold corresponding to inefficient energy consumption. Upon detecting that the lead vehicle is inefficiently oscillating between accelerating and decelerating, the adaptive cruise control unit performs a corrective measure to increase an energy-consumption efficiency of the vehicle. For example, a vehicle disclosed herein is configured to perform adaptive cruise control. While performing adaptive cruise control, the vehicle follows behind a lead vehicle by a predetermined distance and/or time gap. The vehicle of the examples disclosed herein include sensor(s) and/or sensor(s) that are configured to monitor acceleration of vehicles in other lanes.

Further, the vehicle monitors characteristics to determine whether the lead vehicle is oscillating between accelerating and decelerating in such a manner that reduces energy-consumption efficiency of the vehicle. In some examples, the vehicle monitors an acceleration of the lead vehicle over a period of time to determine whether the lead vehicle is oscillating between accelerating and decelerating. In such examples, the vehicle identifies whether the lead vehicle has oscillated outside of a predetermined acceleration threshold more than a predetermined number of times. In other examples, the vehicle monitors an amount of energy consumed by an engine or motor of the vehicle over a period of time while the vehicle is following the lead vehicle. In such examples, the vehicle identifies whether the lead vehicle has oscillated beyond a predetermined threshold if the engine or motor of the vehicle consumes more than a predetermined amount of energy while trailing the lead vehicle.

Upon detecting that the acceleration and deceleration of the lead vehicle is oscillating beyond the predetermined threshold, the vehicle of examples disclosed herein (1) transmits a message via vehicle-to-vehicle V2V communication to the lead vehicle to suggest that the lead vehicle activate cruise control (e.g., adaptive cruise control), (2) smoothes a trailing algorithm of the adaptive cruise control of the vehicle that is utilized to trail behind the lead vehicle, (3) emits an alarm to alert an operator of the driver that (i) indicates fuel efficiency of the vehicle is being degraded due to the lead vehicle and/or (ii) suggests that the operator change lanes to an adjacent lane, and/or (4) causes the vehicle to autonomously change lanes into the adjacent lane.

Turning to the figures, FIG. 1 illustrates an example vehicle 100 in accordance with the teachings herein. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input). The vehicle 100 may be a standard gasoline powered vehicle, an electric vehicle, a hybrid vehicle, a fuel cell vehicle, and/or any other mobility implement type of vehicle.

In the illustrated example, the vehicle 100 is a hybrid vehicle that includes a combustion engine 102 and an electric motor 104. The combustion engine 102 (e.g., an internal combustion engine) generates mechanical power to propel the vehicle 100 by combusting fuel (e.g., gasoline, petrol, etc.) that is stored in a fuel tank 106 of the vehicle 100. That is, the fuel stored in the fuel tank 106 is an energy source for the combustion engine 102. The vehicle 100 of the illustrated example includes a fuel level sensor 108 that detects an amount of fuel that is stored in the fuel tank 106 for the combustion engine 102. For example, by monitoring the amount of fuel that is stored in the fuel level sensor 108 over a period of time, the fuel tank 106 detects an amount of energy that is consumed for operating the combustion engine 102 over that period of time. Further, the electric motor 104 generates mechanical power to propel the vehicle 100 by converting electrical energy into mechanical energy. For example, the vehicle includes a battery 110 (e.g., of a battery cell and/or a battery pack) for storing electrical energy that is provided to the electric motor 104 to propel the vehicle 100. That is, current stored in the battery 110 is an energy source for the electric motor 104. The vehicle 100 of the illustrated example includes battery monitoring system (BMS) sensor 112 that detects an amount of current that is stored in the battery 110 for the electric motor 104. For example, by monitoring the amount of current that is stored in the battery 110 over a period of time, the BMS sensor 112 detects an amount of energy that is consumed for operating the electric motor 104 over that period of time. In other examples, the vehicle 100 includes any other type of engine or motor that is configured to propel the vehicle 100 and/or any other corresponding type of sensor that is configured to monitor an amount of energy that is consumed.

As illustrated in FIG. 1, the vehicle 100 includes a cluster output 114, a display 116, and speakers 118. For example, the cluster output 114 presents an indicator (e.g., a low tire pressure indicator, a check engine indicator, a change lanes indicator, etc.) to provide instructions and/or other information to a driver of the vehicle 100. The display 116 (e.g., a touchscreen) presents visual signals to occupant(s) of the vehicle 100 for informative and/or entertainment purposes, and the speakers 118 present audio signals to occupant(s) of the vehicle 100 for informative and/or entertainment purposes.

In the illustrated example, the vehicle 100 includes a vehicle speed sensor 120 and an accelerometer 122. The vehicle speed sensor 120 detects a speed at which the vehicle 100 is travelling. Further, by monitoring the speed of the vehicle 100 over a period of time, the vehicle speed sensor 120 detects an acceleration at which the vehicle 100 is travelling. Additionally or alternatively, the accelerometer 122 detects the acceleration at which the vehicle 100 is travelling.

The vehicle 100 of the illustrated example also includes a communication module 123 that includes wired or wireless network interfaces to enable communication with external networks. The communication module 123 also includes hardware (e.g., processors, memory, storage, antenna, etc.) and software to control the wired or wireless network interfaces. In the illustrated example, the communication module 123 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the communication module 123 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

Further, the vehicle 100 includes a communication module 124. For example, the communication module 124 is a dedicated short-range communication (DSRC) module that includes antenna(s), radio(s) and software to broadcast messages and to establish connections between the vehicle 100 and other vehicle(s) (e.g., a lead vehicle 206 of FIG. 2, a vehicle 208 of FIG. 2), infrastructure-based modules, and mobile device-based modules. For example, the communication module 124 is configured to communicate with other vehicles via vehicle-to-vehicle (V2V) communication and/ or with infrastructure-based modules via vehicle-to-infrastructure (V2I) communication.

More information on the DSRC network and how the network may communicate with vehicle hardware and software is available in the U.S. Department of Transportation's Core June 2011 System Requirements Specification (SyRS) report (available at http://www.its.dot.gov/meetings/pdf/ CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

As illustrated in FIG. 1, the vehicle 100 also includes an adaptive cruise control unit 126 that perform autonomous and/or semi-autonomous motive functions for adaptive cruise control of the vehicle 100. For example, the adaptive cruise control unit 126 performs autonomous and/or semi-autonomous motive functions to enable the vehicle 100 to travel at a target speed set by a vehicle operator (e.g., a driver), accelerate to the target speed and/or to decelerate upon detecting that the vehicle 100 is approaching another object (e.g., a lead vehicle 206 of FIG. 2). That is, the adaptive cruise control unit 126 controls a speed, acceleration, and/or deceleration of the vehicle 100 based upon the target speed set by the vehicle operator and information of a surrounding area of the vehicle that is collected, for example, via camera(s) and/or sensor(s) of the vehicle 100.

In the illustrated example, the vehicle 100 includes a camera 128 (e.g., a front camera, first camera), a proximity sensor 130 (e.g., a front proximity sensor, a first proximity sensor), one or more cameras 132 (e.g., side cameras, second cameras), and one or more proximity sensors 134 (e.g., side proximity sensors, second proximity sensors). The camera 128 captures image(s) and/or video of a surrounding area in front of the vehicle 100, and the cameras 132 capture image(s) and/or video of a surrounding area to the side of the vehicle 100. For example, the image(s) and/or video captured by the camera 128 and/or one or more of the cameras 132 are utilized by the adaptive cruise control unit 126 to perform autonomous and/or semi-autonomous driving maneuvers for adaptive cruise control of the vehicle 100 and/or are presented to occupant(s) of the vehicle 100 (e.g., via the display 116). Further, the proximity sensor 130 monitors the surrounding area in front of the vehicle 100, and the proximity sensors 134 monitor the surrounding areas to the side of the vehicle 100. The proximity sensor 130 and the proximity sensors 134 collect data that detects and identifies location(s) of object(s) near the vehicle 100. The collected data is utilized by the adaptive cruise control unit 126 to perform autonomous and/or semi-autonomous driving maneuvers for adaptive cruise control of the vehicle 100. Further, the proximity sensor 130 and/or one or more of the proximity sensors 134 include a radar sensor, a lidar sensor, an ultrasonic sensor, and/or any other proximity sensor that detects the presence and location of nearby objects. For example, a radar sensor detects and locates an object via radio waves, a lidar sensor detects and locates the object via lasers, and an ultrasonic sensor detects and locates the object via ultrasound waves.

Figure 2:
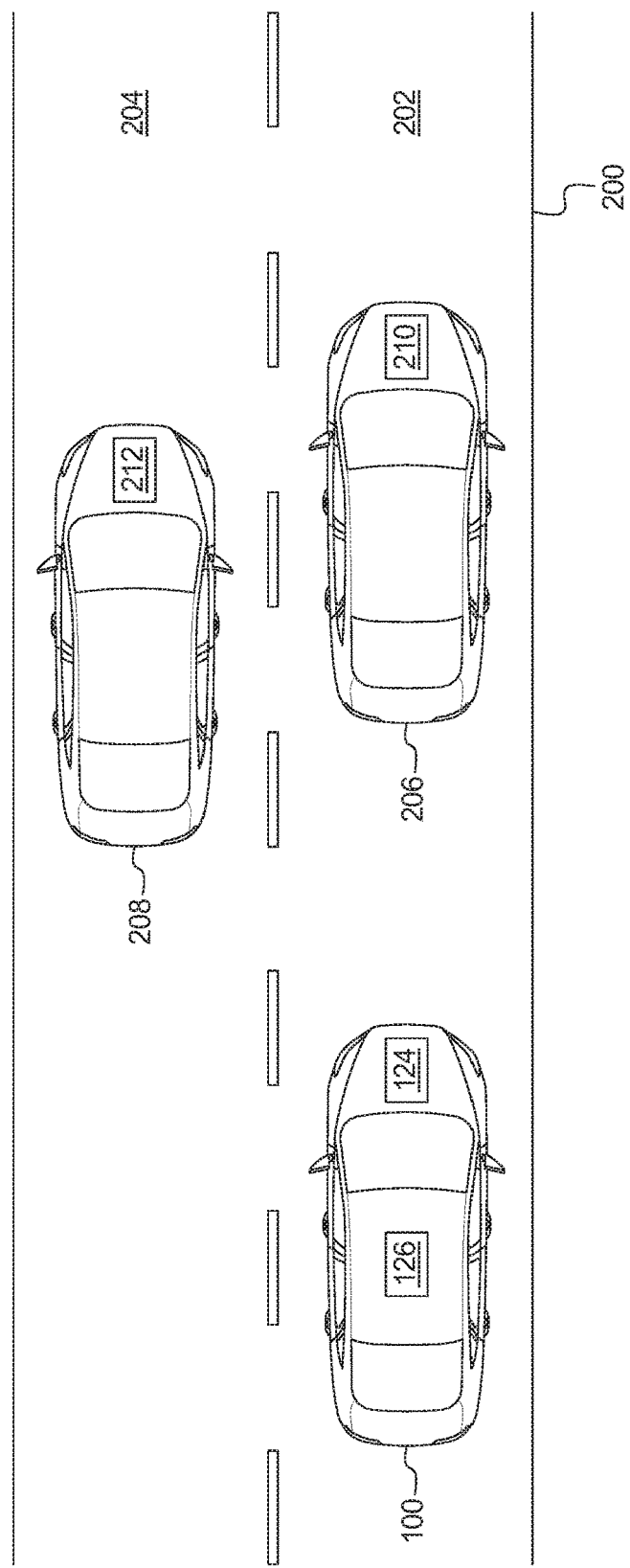
FIG. 2 illustrates the vehicle of FIG. 1 performing adaptive cruise control behind a lead vehicle.

FIG. 2 illustrates the vehicle 100 traveling along a road 200 in a lane 202. As illustrated in FIG. 2, the road 200 includes the lane 202 and another lane 204 adjacent to the lane 202 that are each designated for vehicles traveling in a same direction. For example, the vehicle 100 is traveling behind a lead vehicle 206 within the lane 202, and another vehicle 208 is traveling in the lane 204 adjacent to the vehicle 100.

In the illustrated example, the adaptive cruise control of the vehicle 100 is activated. While the adaptive cruise control is activated, the adaptive cruise control unit 126 of the vehicle 100 identifies whether the vehicle 100 is traveling behind a lead vehicle. For example, the adaptive cruise control unit 126 detects that the vehicle 100 is traveling behind the lead vehicle 206 in FIG. 2. In some examples, upon identifying the presence of the lead vehicle 206, the adaptive cruise control unit 126 of the vehicle 100 determines whether the lead vehicle 206 is traveling at a lead vehicle speed that is less and/or slower than a speed setting of the adaptive cruise control of the vehicle 100.

The speed setting of the vehicle 100 is a maximum speed at which the adaptive cruise control unit 126 is set to cause the vehicle 100 to travel. In some examples, the speed setting of the adaptive cruise control unit 126 is set by the operator of the vehicle 100 before the adaptive cruise control is activated. Additionally or alternatively, the adaptive cruise control unit 126 is configured to limit the speed setting to a speed less that is less than or equal to a present speed limit of the road 200 for the vehicle 100. For example, the adaptive cruise control unit 126 of the vehicle 100 determines the present speed limit of the road 200 for the vehicle 100 based upon a roadside sign that is detected via image(s) and/or video captured by the camera 128 and/or one or more of the cameras 132 of the vehicle 100. For example, the vehicle 100 includes an image recognition system and/or software that enables the adaptive cruise control unit 126 to determine the speed limit identified on the roadside sign. Further, in some examples, the adaptive cruise control unit 126 determines the present speed limit of the road 200 via a navigation system and/or via V2V communication with the lead vehicle 206 and/or the vehicle 208. For example, the vehicle 100 includes an on-board navigation system and/or communicates with the navigation system of an external network (e.g., the Internet) via a communication module.

Further, prior to comparing the speed setting of the vehicle 100 to the lead vehicle speed of the lead vehicle 206, the adaptive cruise control unit 126 of the vehicle 100 determines the lead vehicle speed of the lead vehicle 206. For example, the adaptive cruise control unit 126 detects the lead vehicle speed of the lead vehicle 206 based upon image(s) and/or video captured by the camera 128 and/or data collected by the proximity sensor 130. That is, the proximity sensor 130 collects data that enables the adaptive cruise control unit 126 to detect the presence of and determine a speed of the lead vehicle 206. Additionally or alternatively, the adaptive cruise control unit 126 detects the lead vehicle speed of the lead vehicle 206 via V2V communication and/or V2X communication that is received by the communication module 124 and/or via communication with a network that is received by the communication module 123. For example, the communication module 124 receives the lead vehicle speed of the lead vehicle 206 from a communication module 210 (e.g., a DSRC module) of the lead vehicle 206, a communication module 212 (e.g., a DSRC module) of the vehicle 208, a communication module (e.g., a DSRC module) of an infrastructure device (e.g., a roadside sign, a roadside light, etc.), etc.

In operation, the adaptive cruise control unit 126 of the illustrated example performs adaptive cruise control for the vehicle 100. For example, while the adaptive cruise control unit 126 performs adaptive cruise control, the adaptive cruise control unit 126 controls acceleration and/or deceleration of the vehicle 100 to cause the vehicle 100 to trail behind the lead vehicle 206 by a predetermined distance and/or a predetermined time period.

While trailing the lead vehicle 206, the adaptive cruise control unit 126 of the illustrated example determines whether the lead vehicle 206 is accelerating and decelerating in an oscillating manner. For example, the adaptive cruise control unit 126 determines an acceleration oscillation value of the lead vehicle 206 based upon collected data. That is, the acceleration oscillation value corresponds to an amount of acceleration and deceleration performed by the lead vehicle over a predetermined period of time. For example, the adaptive cruise control unit 126 determines that the lead vehicle 206 has a small acceleration oscillation value if the lead vehicle 206 is travelling at a substantially constant velocity (e.g., the lead vehicle 206 has good longitudinal control) and the determines that the lead vehicle 206 has a large acceleration oscillation value if the lead vehicle 206 is repeatedly accelerating and decelerating over a period of time (e.g., the lead vehicle 206 has poor longitudinal control). Further, the adaptive cruise control unit 126 determines whether the acceleration oscillation value exceeds a threshold.

In some examples, the adaptive cruise control unit 126 of the vehicle 100 determines the acceleration oscillation value of the lead vehicle 206 based upon collected acceleration and/or deceleration measurements of the lead vehicle 206. For example, the camera 128 collects image(s) and/or video of the lead vehicle 206 while the vehicle 100 travels behind the lead vehicle 206 to enable the adaptive cruise control unit 126 of the vehicle 100 to collect acceleration measurements of the lead vehicle 206. Additionally or alternatively, the proximity sensor 130 detect location data of the lead vehicle 206 while the vehicle 100 travels behind the lead vehicle 206 to enable the adaptive cruise control unit 126 of the vehicle 100 to collect acceleration measurements of the lead vehicle 206. Further, in some examples, the adaptive cruise control unit 126 collects the acceleration measurements of the lead vehicle 206 via the communication module 124 and/or the communication module 123. For example, the communication module 124 receives the acceleration measurements from the lead vehicle 206 (e.g., via V2V communication sent from the communication module 210), the vehicle 208 (e.g., via V2V communication sent from the communication module 212), and/or an infrastructure module (e.g., via V2I communication) that has been monitoring the acceleration and/or deceleration of the lead vehicle 206 over time. The communication module 123 is configured to receive the acceleration measurements of the lead vehicle 206 from a network that are collected from other vehicle(s) (e.g., the lead vehicle 206, the vehicle 208), infrastructure module(s), and/or a global positioning system (GPS). The adaptive cruise control unit 126 identifies which data to collect for the lead vehicle 206, for example, based upon GPS data of the vehicle 100 and/or unique identifier of the lead vehicle 206 (e.g., a license plate number, a VIN number, etc.).

Further, in such examples, the threshold corresponds to a threshold number of occurrences in which the lead vehicle 206 accelerates or decelerates beyond an acceleration threshold range. That is, the adaptive cruise control unit 126 monitors a speed at which the lead vehicle 206 travels over a period of time to determine whether the lead vehicle 206 repeatedly accelerates and decelerates in an oscillating manner. For example, the acceleration threshold range is determined based upon an average speed of the vehicle 100, a target speed of the vehicle 100, and/or an average speed of the lead vehicle 206. Further, the adaptive cruise control unit 126 counts a number of occurrences that the lead vehicle 206 accelerates or decelerates beyond the acceleration threshold range for a predetermined period of time (e.g., 30 seconds, 5 minutes, etc.) and/or for while the vehicle 100 is following the lead vehicle 206.

In some examples, the adaptive cruise control unit 126 of the vehicle 100 determines the acceleration oscillation value of the lead vehicle 206 based upon collected energy consumption measurements of the lead vehicle 206. For example, the fuel level sensor 108 measures an amount of energy consumed by the combustion engine 102 and/or the BMS sensor 112 measures an amount of energy consumed by the electric motor 104 while the vehicle 100 travels behind the lead vehicle 206 to enable the adaptive cruise control unit 126 of the vehicle 100. Further, any other sensor may measure an amount of energy consumed by an engine and/or a motor of the vehicle 100 as the vehicle 100 trails behind the lead vehicle 206.

Further, in such examples, the threshold corresponds to an energy consumption threshold of the vehicle 100 while the vehicle 100 is following behind the lead vehicle 206 during adaptive cruise control. That is, the adaptive cruise control unit 126 monitors an amount of energy consumed by the vehicle 100 trailing the lead vehicle 206 to determine whether the lead vehicle 206 repeatedly accelerates and decelerates in an oscillating manner. The energy consumption threshold is determined, for example, based upon an expected amount of energy consumed by the vehicle 100 while travelling at an average speed of the vehicle 100, a target speed of the vehicle 100, and/or an average speed of the lead vehicle 206. For example, if the lead vehicle 206 is accelerating and decelerating in an oscillating manner, the vehicle 100 consumes more energy by accelerating and decelerating to remain within a predetermined distance and/or time period of the lead vehicle 206. If the lead vehicle 206 is travelling at a substantially constant speed, the vehicle 100 consumes less energy to remain within the predetermined distance and/or time period of the lead vehicle 206.

In some examples, the adaptive cruise control unit 126 determines a score based upon the collected measurements that corresponds to the acceleration oscillation value of the lead vehicle 206. For example, the adaptive cruise control unit 126 may calculate a score as a decimal on a scale from 0 to 1, as a percentage on a scale from 0 to 100 percent, etc. In such examples, the adaptive cruise control unit 126 determines whether the acceleration oscillation value of the lead vehicle 206 exceeds the threshold by determining whether the calculated score exceeds a threshold score.

Further, in some examples, the adaptive cruise control unit 126 sends the acceleration oscillation value (e.g., an acceleration/deceleration count, an energy consumption value, a score) to a network via the communication module 123. In such examples, another vehicle (e.g., the vehicle 208) collects the acceleration oscillation value of the lead vehicle 206 from the network to determine how to proceed when the other vehicle is trailing behind the lead vehicle 206. Additionally or alternatively, the adaptive cruise control unit 126 of the vehicle 100 may collect the acceleration oscillation value of the lead vehicle 206 from the network via the communication module 123.

In response to determining that the acceleration oscillation value of the lead vehicle 206 exceeds a threshold, the adaptive cruise control unit 126 performs one or more functions to increase the energy consumption efficiency of the vehicle 100. For example, responsive to determining that the acceleration oscillation value exceeds the threshold, the adaptive cruise control unit 126 sends an instruction, via V2V communication and the communication module 124, to the lead vehicle 206. The instruction, for example, alerts an operator of the lead vehicle 206 to its oscillating acceleration and/or suggest that the operator activate cruise control (e.g., adaptive cruise control) for the lead vehicle 206. In some examples, the adaptive cruise control unit 126 smoothes, based upon the acceleration oscillation value, a trailing algorithm that the adaptive cruise control unit 126 utilizes to perform adaptive cruise control while trailing behind the lead vehicle 206. For example, the adaptive cruise control unit 126 smoothes the trailing algorithm to reduce an amount of acceleration and deceleration that the vehicle 100 performs while trailing behind the lead vehicle 206.

Further, in some examples, the adaptive cruise control unit 126 monitors an adjacent lane (e.g., the lane 204) responsive to determining that the acceleration oscillation value of the lead vehicle 206 exceeds a threshold. For example, the adaptive cruise control unit 126 monitors an acceleration of the vehicle 208 that is travelling within the lane 204. The adaptive cruise control unit 126 collects acceleration measurements of the vehicle 208 within the lane 204 via the camera 128, the proximity sensor 130, one or more of the cameras 132, one or more of the proximity sensors 134, communication (e.g., V2V communication, V2X communication) received via the communication module 124, communication with a network received via the communication module 123, etc. Further, the adaptive cruise control unit 126 determines an acceleration oscillation value of the vehicle 208 and subsequently compares the acceleration oscillation value of the vehicle 208 to a threshold. In some examples, responsive to determining that the acceleration oscillation value of the vehicle 208 exceeds the threshold, the adaptive cruise control unit 126 instructs (e.g., via the cluster output 114, the display 116, the speakers 118, etc.) the operator of the vehicle 100 to change lanes into the lane 204. Further, in some examples, the adaptive cruise control unit 126 causes the vehicle 100 to autonomously change lanes responsive to determining that the acceleration oscillation value of the vehicle 208 exceeds the threshold.

Additionally or alternatively, different functions performed by the adaptive cruise control unit 126 corresponds to different thresholds. For example, the threshold (e.g., a first threshold) utilized for determining whether to send a V2V signal to the lead vehicle 206 is different than the threshold (e.g., a second threshold) utilized for determining whether to instruct the vehicle 100 to change lanes.

Figure 3:
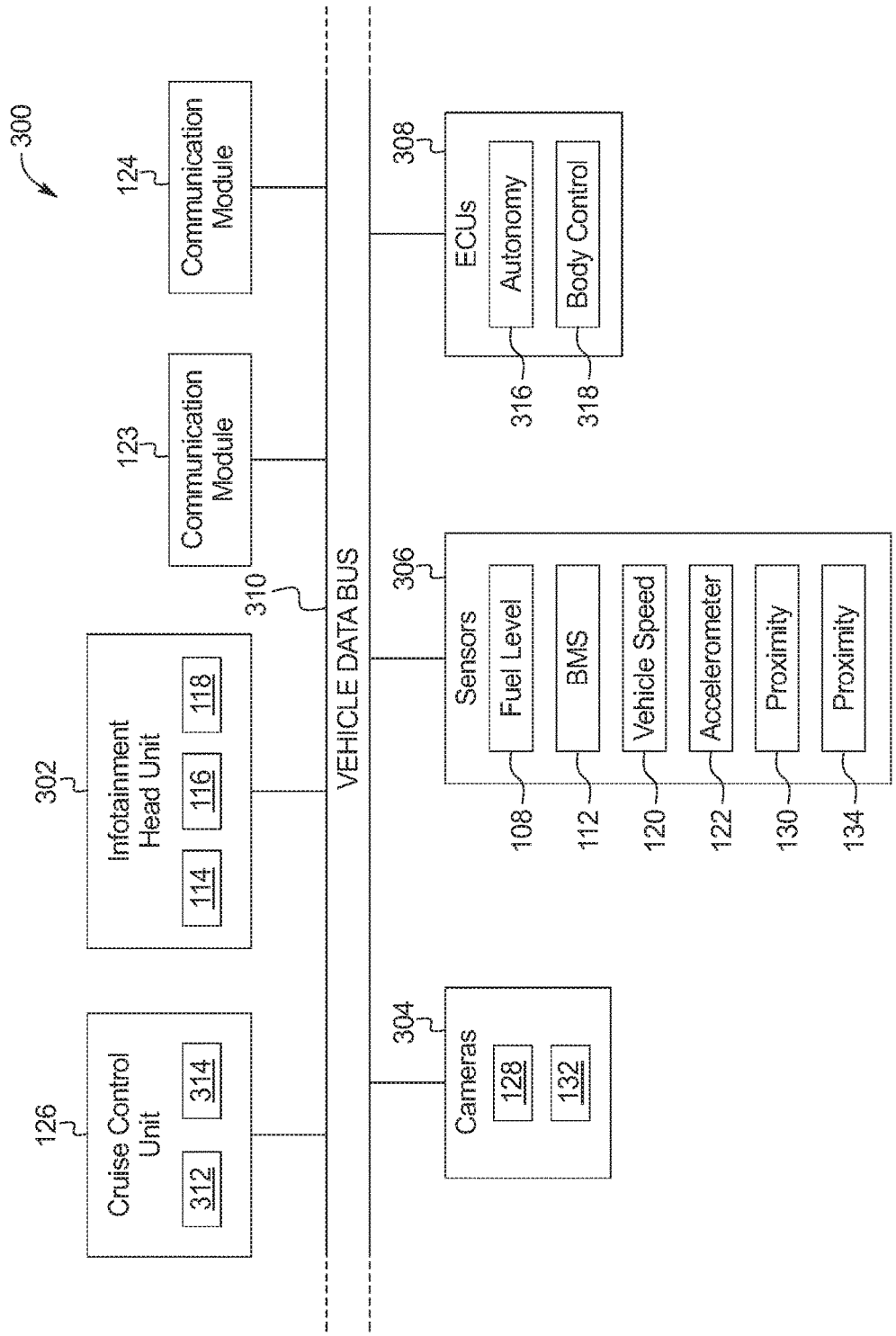
FIG. 3 is a block diagram of electronic components of the vehicle of FIG. 1.

FIG. 3 is a block diagram of electronic components 300 of the vehicle 100. As illustrated in FIG. 3, the electronic components 300 include the adaptive cruise control unit 126, an infotainment head unit 302, the communication module 123 the communication module 124, cameras 304, sensors 306, electronic control units (ECUs) 308, and a vehicle data bus 310.

The adaptive cruise control unit 126 includes a microcontroller unit, controller or processor 312 and memory 314. In other examples, the adaptive cruise control unit 126 is incorporated into another electronic control unit (ECU) with its own processor 312 and memory 314. The processor 312 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 314 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 314 includes multiple kinds of memory, particularly volatile memory and non-volatile memory.

The memory 314 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 314, the computer readable medium, and/or within the processor 312 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 302 provides an interface between the vehicle 100 and a user. The infotainment head unit 302 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include the cluster output 114, other instrument cluster outputs (e.g., dials, lighting devices), actuators, a heads-up display, the display 116 (e.g., a center console display such as a liquid crystal display (LCD), an organic light emitting diode (OLED) display, a flat panel display, a solid state display, etc.), and/or the speakers 118. In the illustrated example, the infotainment head unit 302 includes hardware (e.g., a processor or controller, memory, storage, etc.) and software (e.g., an operating system, etc.) for an infotainment system (such as SYNC® and MyFord Touch® by Ford®). Additionally, the infotainment head unit 302 displays the infotainment system on, for example, the display 116.

The cameras 304 capture image(s) and/or video of a surrounding area of the vehicle 100. For example, the cameras 304 of the illustrated example include the camera 128 and the cameras 132 that capture image(s) and/or video of the surrounding area of the vehicle 100 to enable the adaptive cruise control unit 126 to monitor acceleration characteristics of the lead vehicle 206 and/or the vehicle 208 that are near the vehicle 100. Further, in some examples, the cameras 304 capture image(s) and/or video that are presented to occupant(s) of the vehicle 100 (e.g., via the display 116) and/or are utilized to facilitate performance of autonomous and/or semi-autonomous driving maneuvers of the vehicle 100.

The sensors 306 are arranged in and around the vehicle 100 to monitor properties of the vehicle 100 and/or an environment in which the vehicle 100 is located. One or more of the sensors 306 may be mounted to measure properties around an exterior of the vehicle 100. Additionally or alternatively, one or more of the sensors 306 may be mounted inside a cabin of the vehicle 100 or in a body of the vehicle 100 (e.g., an engine compartment, wheel wells, etc.) to measure properties in an interior of the vehicle 100. For example, the sensors 306 include accelerometers, odometers, tachometers, pitch and yaw sensors, wheel speed sensors, microphones, tire pressure sensors, biometric sensors and/or sensors of any other suitable type. In the illustrated example, the sensors 306 include the fuel level sensor 108, the BMS sensor 112, the vehicle speed sensor 120, the accelerometer 122, the proximity sensor 130, and the proximity sensors 134.

The ECUs 308 monitor and control the subsystems of the vehicle 100. For example, the ECUs 308 are discrete sets of electronics that include their own circuit(s) (e.g., integrated circuits, microprocessors, memory, storage, etc.) and firmware, sensors, actuators, and/or mounting hardware. The ECUs 308 communicate and exchange information via a vehicle data bus (e.g., the vehicle data bus 310). Additionally, the ECUs 308 may communicate properties (e.g., status of the ECUs 308, sensor readings, control state, error and diagnostic codes, etc.) to and/or receive requests from each other. For example, the vehicle 100 may have seventy or more of the ECUs 308 that are positioned in various locations around the vehicle 100 and are communicatively coupled by the vehicle data bus 310.

In the illustrated example, the ECUs 308 include an autonomy unit 316 and a brake control module 318. For example, the autonomy unit 316 controls performance of autonomous and/or semi-autonomous driving maneuvers (e.g., changing lanes, parking, etc.) of the vehicle 100 based upon, at least in part, image(s) and/or video captured by the cameras 128, 132 and/or data collected by the proximity sensors 130, 134. Further, the brake control module 318 autonomously operate(s) braking of the vehicle 100.

The vehicle data bus 310 communicatively couples the communication module 123, the communication module 124, the adaptive cruise control unit 126, the infotainment head unit 302, the cameras 304, the sensors 306, and the ECUs 308. In some examples, the vehicle data bus 310 includes one or more data buses. The vehicle data bus 310 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
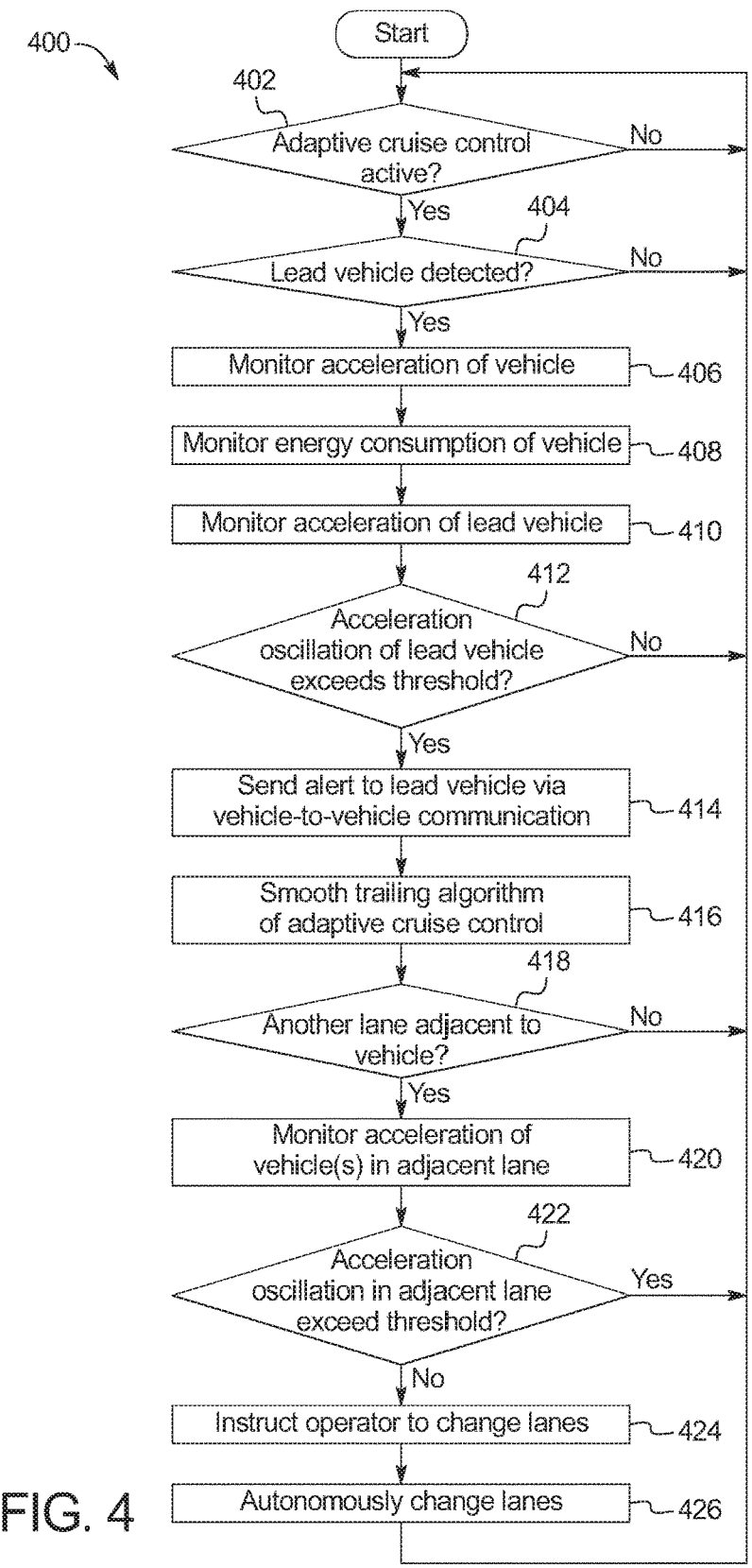
FIG. 4 is a flowchart for monitoring acceleration of a lead vehicle for adaptive cruise control in accordance with the teachings herein.

FIG. 4 is a flowchart of an example method 400 to monitor acceleration of a lead vehicle for adaptive cruise control. The flowchart of FIG. 4 is representative of machine readable instructions that are stored in memory (such as the memory 314 of FIG. 3) and include one or more programs which, when executed by a processor (such as the processor 312 of FIG. 3), cause the vehicle 100 to implement the example adaptive cruise control unit 126 of FIGS. 1-3. While the example program is described with reference to the flowchart illustrated in FIG. 4, many other methods of implementing the example adaptive cruise control unit 126 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the adaptive cruise control unit 126 determines whether is active. In response to the adaptive cruise control unit 126 determining that adaptive cruise control is not activated, the method 400 remains at block 402. Otherwise, in response to the adaptive cruise control unit 126 determining that adaptive cruise control is activated, the method 400 proceeds to block 404 at which the adaptive cruise control unit 126 determines whether a lead vehicle (e.g., the lead vehicle 206 of FIG. 2) has been detected. For example, the adaptive cruise control unit 126 determines whether a lead vehicle is detected in front of the vehicle 100 via the camera 128, the proximity sensor 130, V2V communication received via the communication module 124, and/or communication with a network via the communication module 123. In response to the adaptive cruise control unit 126 detecting that a lead vehicle is not in front of the vehicle 100, the method 400 returns to block 402. Otherwise, in response to the adaptive cruise control unit 126 detecting that a lead vehicle is in front of the vehicle 100, the method 400 proceeds to block 406.

At block 406, the adaptive cruise control unit 126 monitors an acceleration of the vehicle 100. For example, the adaptive cruise control unit 126 monitors the vehicle acceleration via the vehicle speed sensor 120 and/or the accelerometer 122 of the vehicle 100. At block 408, the adaptive cruise control unit 126 monitors an energy consumption of the vehicle 100 while the vehicle 100 is trailing the lead vehicle. For example, the adaptive cruise control unit 126 monitors an amount of energy consumed to propel the vehicle 100 via the fuel level sensor 108 for the combustion engine 102, the BMS sensor 112 for the electric motor 104, and/or any other sensor for any other motor or engine of the vehicle 100. At block 410, the adaptive cruise control unit 126 monitors an acceleration of the lead vehicle while the vehicle 100 is trailing the lead vehicle. For example, the adaptive cruise control unit 126 monitors the acceleration of the lead vehicle over time via the camera 128, the proximity sensor 130, V2V communication via the communication module 124, and/or communication with a network via the communication module 123.

At block 412, the adaptive cruise control unit 126 determines whether an acceleration oscillation value of the lead vehicle exceeds a predetermined threshold. In some examples, the adaptive cruise control unit 126 of the vehicle 100 determines an acceleration oscillation value of the lead vehicle based upon the energy consumption measurements of the vehicle 100. For example, the acceleration oscillation value of the lead vehicle determined by the adaptive cruise control unit 126 corresponds to an amount of energy consumed by the vehicle 100 while trialing the lead vehicle, and the predetermined threshold corresponds to a predetermined threshold range of an amount of energy consumed while the vehicle 100 travels at a constant rate of travel (e.g., at the target speed of travel for the adaptive cruise control, at an average speed while trailing the lead vehicle, etc.). Additionally or alternatively, the adaptive cruise control unit 126 of the vehicle 100 determines the acceleration oscillation value of the lead vehicle based upon the collected acceleration measurements of the lead vehicle. For example, the acceleration oscillation value of the lead vehicle determined by the adaptive cruise control unit 126 corresponds to a number of occurrences that the lead vehicle accelerates and/or decelerates beyond a predetermined acceleration threshold range, and the predetermined acceleration threshold range corresponds to a predetermined number of occurrences that the lead vehicle accelerates or decelerates beyond a predetermined level. In response to the adaptive cruise control unit 126 determining that the acceleration oscillation value of the lead vehicle does not exceed the predetermined threshold, the method 400 returns to block 402. Otherwise, in response to the adaptive cruise control unit 126 determining that the acceleration oscillation value of the lead vehicle exceeds the predetermined threshold, the method 400 proceeds to block 414.

At block 414, the adaptive cruise control unit 126 of the vehicle 100 sends an alert to the lead vehicle via the communication module 124 and V2V communication. The vehicle 100 sends the alert to the lead vehicle to instruct the lead vehicle to activate cruise control. At block 416, the adaptive cruise control unit 126 smoothes a trailing algorithm that the adaptive cruise control unit 126 utilizes to perform adaptive cruise control to trail the lead vehicle 206.

At block 418, the adaptive cruise control unit 126 determines whether there is another lane (e.g., the lane 204) that is adjacent to the lane (e.g., the lane 202) in which the vehicle 100 is travelling. For example, the adaptive cruise control unit 126 detects a presence of an adjacent lane via the camera 128, the proximity sensor 130, one or more of the cameras 132, one or more of the proximity sensors 134, communication (e.g., V2V communication, V2X communication) received via the communication module 124, and/or communication with a network via the communication module 123. In response to the adaptive cruise control unit 126 determining that there is not another lane, the method 400 returns to block 402. Otherwise, in response to the adaptive cruise control unit 126 determining that there is another lane, the method 400 proceeds to block 420.

At block 420, the adaptive cruise control unit 126 monitors an acceleration of vehicle(s) (e.g., the vehicle 208) travelling within the adjacent lane. For example, the adaptive cruise control unit 126 monitors the acceleration of adjacent vehicle(s) via the camera 128, the proximity sensor 130, one or more of the cameras 132, one or more of the proximity sensors 134, communication (e.g., V2V communication, V2X communication) received via the communication module 124, and/or communication with a network received via the communication module 123. At block 422, the adaptive cruise control unit 126 determines whether acceleration oscillation value(s) of the adjacent vehicle(s) exceed a predetermined threshold. For example, the acceleration oscillation value(s) of the adjacent vehicle(s) determined by the adaptive cruise control unit 126 corresponds to a number of occurrences that the adjacent vehicle(s) accelerate and/or decelerate beyond a predetermined acceleration threshold range, and the predetermined acceleration threshold range corresponds to a predetermined number of occurrences that the adjacent vehicle(s) accelerate or decelerate beyond a predetermined level. In response to the adaptive cruise control unit 126 determining that the acceleration oscillation value(s) of the adjacent vehicle(s) do not exceed the predetermined threshold, the method 400 returns to block 402. Otherwise, in response to the adaptive cruise control unit 126 determining that the acceleration oscillation value(s) of the adjacent vehicle(s) exceed the predetermined threshold, the method 400 proceeds to block 424.

At block 424, the adaptive cruise control unit 126 instructs (e.g., via the cluster output 114, the display 116, the speakers 118, etc.) the operator of the vehicle 100 to change lanes. At block 426, the adaptive cruise control unit 126 causes the vehicle 100 to autonomously change lanes. For example, the adaptive cruise control unit 126 sends a signal to instruct the autonomy unit 316 to autonomously change lanes into the adjacent lane.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a communication module for V2V communication;
   a camera;
   a sensor; and
   an adaptive cruise control unit to:
      determine an acceleration oscillation value of a lead vehicle based upon measurements collected via at least one of the camera and the sensor; and
      send, via the communication module, an instruction to the lead vehicle to activate cruise control responsive to determining the acceleration oscillation value exceeds a threshold.

2. The vehicle of claim 1, wherein the acceleration oscillation value corresponds to an amount of acceleration and deceleration performed by the lead vehicle over a predetermined period of time.

3. The vehicle of claim 1, wherein the measurements are acceleration measurements of the lead vehicle.

4. The vehicle of claim 3, wherein the threshold is a threshold number of occurrences that the lead vehicle accelerates or decelerates beyond a acceleration threshold range.

5. The vehicle of claim 3, wherein the camera collects images of the lead vehicle to enable the adaptive cruise control unit to collect the acceleration measurements.

6. The vehicle of claim 3, wherein the sensor includes a proximity sensor that detects location data of the lead vehicle to enable the adaptive cruise control unit to collect the acceleration measurements.

7. The vehicle of claim 3, wherein the adaptive cruise control unit further collects the acceleration measurements via V2V communication with the lead vehicle.

8. The vehicle of claim 1, wherein the measurements are energy consumption measurements that are collected while trailing the lead vehicle.

9. The vehicle of claim 8, wherein the threshold is an energy consumption threshold range that corresponds to a constant rate of travel.

10. The vehicle of claim 8, wherein the sensor is selected from the group consisting of a fuel level sensor that monitors a fuel tank and a BSM sensor that monitors a current of a battery.

11. The vehicle of claim 1, wherein the adaptive cruise control unit is to:
    collect second acceleration measurements of an adjacent vehicle in an adjacent lane of travel;
    determine a second acceleration oscillation value based on the second acceleration measurements; and
    compare the second acceleration oscillation value to a second threshold.

12. The vehicle of claim 11, wherein the adaptive cruise control unit emits an alert responsive to the adaptive cruise control unit determining the second acceleration oscillation value is less than the second threshold.

13. The vehicle of claim 11, wherein the adaptive cruise control unit sends a signal to autonomously change lanes into the adjacent lane responsive to determining the second acceleration oscillation value is less than the second threshold.

14. The vehicle of claim 11, wherein the second threshold is different than the threshold.

15. The vehicle of claim 1, wherein the adaptive cruise control unit smoothes, based upon the acceleration oscillation value, a trailing algorithm utilized for trailing the lead vehicle while adaptive cruise control is activated.

16. A method comprising:
    performing, via a processor, adaptive cruise control for a vehicle;
    collecting measurements via at least one of a camera and a sensor of the vehicle;
    determining, via the processor, an acceleration oscillation value of a lead vehicle based on the measurements; and
    sending, via V2V communication, an instruction to the lead vehicle to activate cruise control responsive to determining the acceleration oscillation value exceeds a threshold.

17. The method of claim 16, wherein the acceleration oscillation value corresponds to an amount of acceleration and deceleration preformed by the lead vehicle over a predetermined period of time.

18. The method of claim 16, further including:
    determining a second acceleration oscillation value of an adjacent vehicle in an adjacent lane of travel; and
    emitting an alert via at least one of a display and a speaker of the vehicle to alert a driver to the adjacent lane responsive to determining the second acceleration oscillation value is less than the threshold.

19. The method of claim 16, further including:
    determining a second acceleration oscillation value of an adjacent vehicle in an adjacent lane of travel; and
    autonomously changing lanes, via the processor, into the adjacent lane responsive to determining the second acceleration oscillation value is less than the threshold.

20. The method of claim 16, further including smoothing, based upon the acceleration oscillation value, a trailing algorithm utilized for trailing the lead vehicle while adaptive cruise control is activated.

* * * * *